(12) United States Patent
Krymski

(10) Patent No.: US 7,209,166 B2
(45) Date of Patent: *Apr. 24, 2007

(54) WIDE DYNAMIC RANGE OPERATION FOR CMOS SENSOR WITH FREEZE-FRAME SHUTTER

(75) Inventor: Alexander I. Krymski, Montrose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/402,923

(22) Filed: Apr. 13, 2006

(65) Prior Publication Data

US 2006/0181624 A1 Aug. 17, 2006

Related U.S. Application Data

(63) Continuation of application No. 10/053,110, filed on Oct. 26, 2001, now Pat. No. 7,050,094.

(60) Provisional application No. 60/243,898, filed on Oct. 26, 2000.

(51) Int. Cl.
*H04N 5/235* (2006.01)
(52) U.S. Cl. .................. 348/221.1; 348/364; 348/308; 348/297
(58) Field of Classification Search ........... 348/308, 348/364, 362, 221.1, 297, 229
See application file for complete search history.

(56) References Cited

U.S. PATENT DOCUMENTS 5,241,575 A * 8/1993 Miyatake et al. ........... 377/60
5,264,940 A * 11/1993 Komiya et al. ............. 348/298
5,471,515 A * 11/1995 Fossum et al. .............. 377/60
6,278,490 B1 * 8/2001 Fukuda et al. .............. 348/362
6,344,877 B1 * 2/2002 Gowda et al. .............. 348/245
6,563,540 B2 * 5/2003 Trevino et al. ............. 348/302
6,710,804 B1 * 3/2004 Guidash .................... 348/302
6,753,920 B1 * 6/2004 Momose et al. ........... 348/371
6,801,248 B1 * 10/2004 Horiuchi ................ 348/208.13
6,850,278 B1 * 2/2005 Sakurai et al. ............. 348/302

FOREIGN PATENT DOCUMENTS

EP 858212 A1 * 8/1998
JP 2001145024 A * 5/2001

* cited by examiner

*Primary Examiner*—Ngoc-Yen Vu
*Assistant Examiner*—Gary C. Vieaux
(74) *Attorney, Agent, or Firm*—Dickstein Shapiro LLP

(57) ABSTRACT

Wide dynamic range operation is used to write a signal in a freeze-frame pixel into the memory twice, first after short integration and then after long integration. The wide dynamic range operation allows the intra-scene dynamic range of images to be extended by combining the image taken with a short exposure time with the image taken with a long exposure time. A freeze-frame pixel is based on voltage sharing between the photodetector PD and the analog memory. Thus, with wide dynamic range operation, the resulting voltage in the memory may be a linear superposition of the two signals representing a bright and a dark image after two operations of sampling.

15 Claims, 3 Drawing Sheets

WIDE DYNAMIC RANGE OPERATION FOR CMOS SENSOR WITH FREEZE-FRAME SHUTTER

CROSS-REFERENCE TO RELATED APPLICATIONS

This application is a continuation of U.S. patent application Ser. No. 10/053,110, filed Oct. 26, 2001 now U.S. Pat. No. 7,050,094, which in turn claims priority under 35 U.S.C. 119/120 from provisional application Ser. No. 60/243,898 filed Oct. 26, 2000, both of which are incorporated in its entirety by references here.

TECHNICAL FIELD

This invention relates to CMOS sensors, and more particularly to operating with a wide dynamic range using freeze-frame shutters.

BACKGROUND

An active pixel sensor ("APS") is a special kind of light sensing device. Each active pixel includes a light sensing element and one or more active transistors within the pixel itself. The active transistors amplify and buffer the signals generated by the light sensing elements in the pixels. One type of such APS devices is disclosed in U.S. Pat. No. 5,471,515 by Fossum et al., the disclosure of which is incorporated herein by reference.

There are many applications for active pixel image sensors, including scientific, as well as commercial and consumer applications. The special techniques of active pixel sensing allow using a semiconductor family formation process which is compatible with CMOS, e.g., NMOS. This technique enables the readout electronic to be integrated on the wafer using a similar process. The result is a high performance sensor with high quantum efficiency and low dark current.

CMOS active pixel image sensors may be operated using a "rolling" shutter. Such a shutter operates by reading out each row of pixels, and then resetting that individual row, and then rolling to read and then reset the next row of pixels. Each pixel hence gets read and then reset at slightly different times. Hence, each pixel has a slightly different time of integration. Some applications, such as high-speed photography, may require more time consistency than is possible using this approach. Therefore, in these other applications, a frame shutter may be used. In the frame shutter mode, all pixels in the array have substantially identical integration start times and integration stop times.

A wide dynamic range (WiDyR) technique was developed for CMOS sensors with a rolling shutter and is described in U.S. Pat. No. 6,115,065, which is incorporated herein by reference. The WiDyR technique allows the extension of the intra-scene dynamic range of images by combining an image taken with a short exposure time with an image taken with a long exposure time. U.S. Pat. No. 6,115,065 teaches designs and operational methods to increase the dynamic range of image sensors and APS devices in particular by achieving more than one integration times for each pixel thereof. An APS system with more than one column-parallel signal chains for readout are described for maintaining a high frame rate in readout. Each active pixel is sampled for multiple times during a single frame readout, thus resulting in multiple integration times. The operation methods can also be used to obtain multiple-integration times for each pixel with an APS design having a single column-parallel signal chain for readout. Furthermore, analog-to-digital conversion of high speed and high resolution can be implemented.

SUMMARY

Wide dynamic range operation is used to write a signal in a freeze-frame pixel into the memory twice, first after short integration and then after long integration. The wide dynamic range operation allows the intra-scene dynamic range of images to be extended by combining the image taken with a short exposure time with the image taken with a long exposure time. A freeze-frame pixel is based on voltage sharing between the photodetector PD and the analog memory. Thus, with wide dynamic range operation, the resulting voltage in the memory may be a linear superposition of the two signals representing a bright and a dark image after two operations of sampling.

DESCRIPTION OF DRAWINGS

These and other features and advantages of the invention will become more apparent upon reading the following detailed description and upon reference to the accompanying drawings.

DETAILED DESCRIPTION

Figure 1:
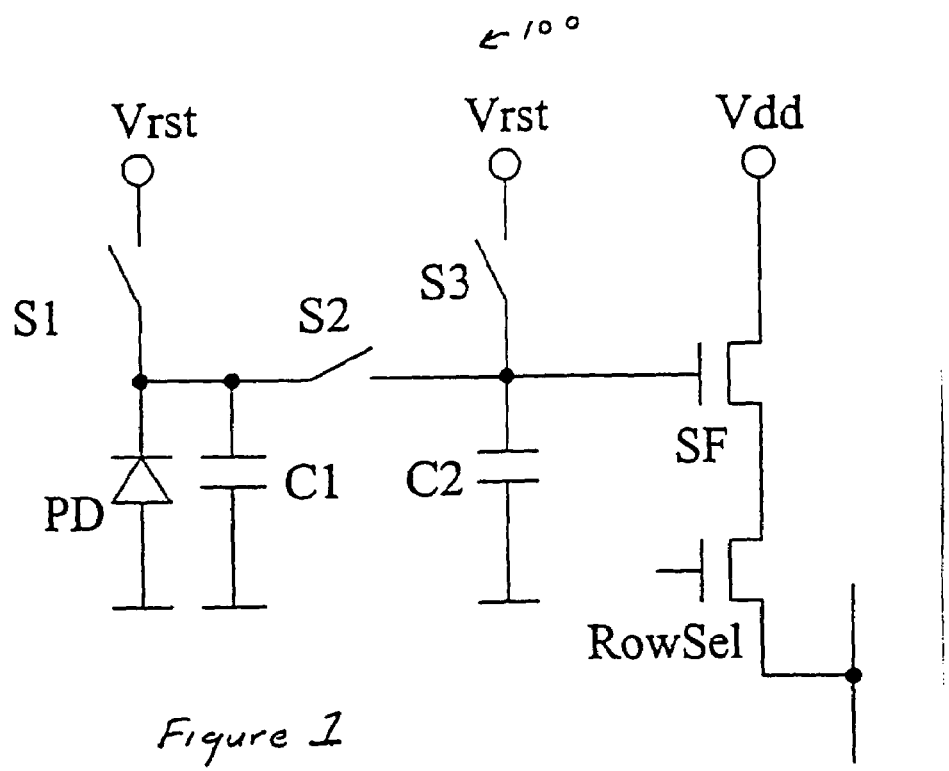
FIG. 1 illustrates one example of a freeze-frame pixel that may be used to obtain samples according to the present invention.

A freeze-frame pixel 100 is shown in FIG. 1 and comprises a photodetector PD with capacitance C1, an analog memory C2, a source follower transistor SF, switches S1–S3, and a row select switch RowSel. The photodetector PD with capacitance C1 is connected to a reset voltage $V_{rst}$ through the switch S1. The analog memory C2 is connected to the reset voltage $V_{rst}$ through switch S3. The photodetector PD with capacitance C1 is connected to the analog memory C2 through the switch S2. The pixel structure 100 allows simultaneous photo-detection and readout of data stored in the pixel memory during the previous frame.

Figure 2:
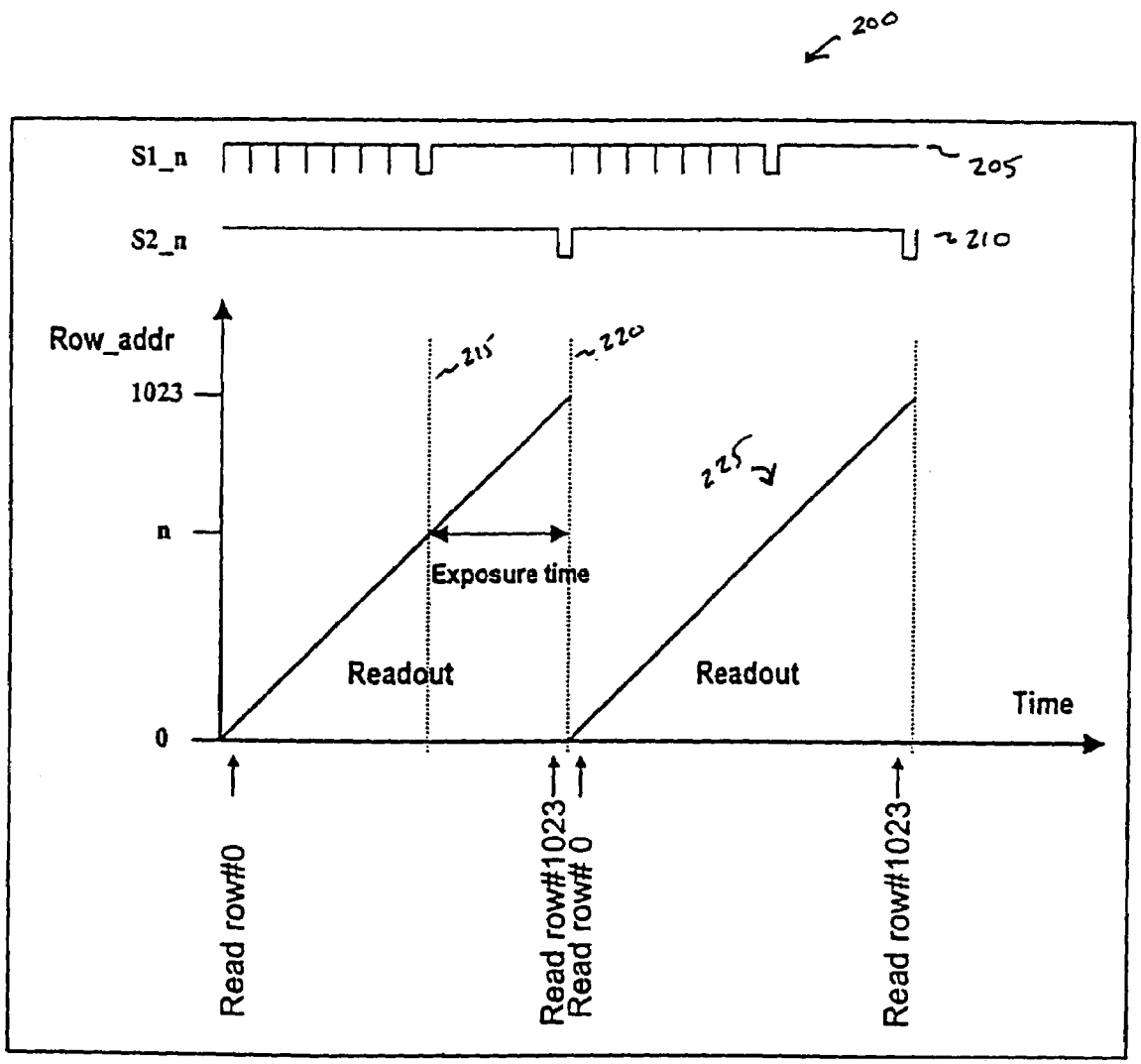
FIG. 2 illustrates sampling without using the wide dynamic range process according to one embodiment of the present invention.

The typical sequence of operations (without WiDyR) functions 200 is illustrated graphically in FIG. 2. The switches S1 and S2 are enabled by active low pulses 205, 210, respectively. The analog memory C2 is reset during a previous readout time through switch S3. To start an exposure 215, the photodetector PD is reset through S1 at the first low pulse in pulse train 205. To complete the integration 220 and transfer the data to the memory, the switch S2 is closed at the first low pulse in pulse train 210, thereby connecting the photodetector PD to the analog memory C2. The readout of the data from the pixel is done row by row. After the pixel signal is read 225, the analog memory is reset through S3. The reset level is also read out to subtract the pixel source follower offset voltage.

Figure 3:
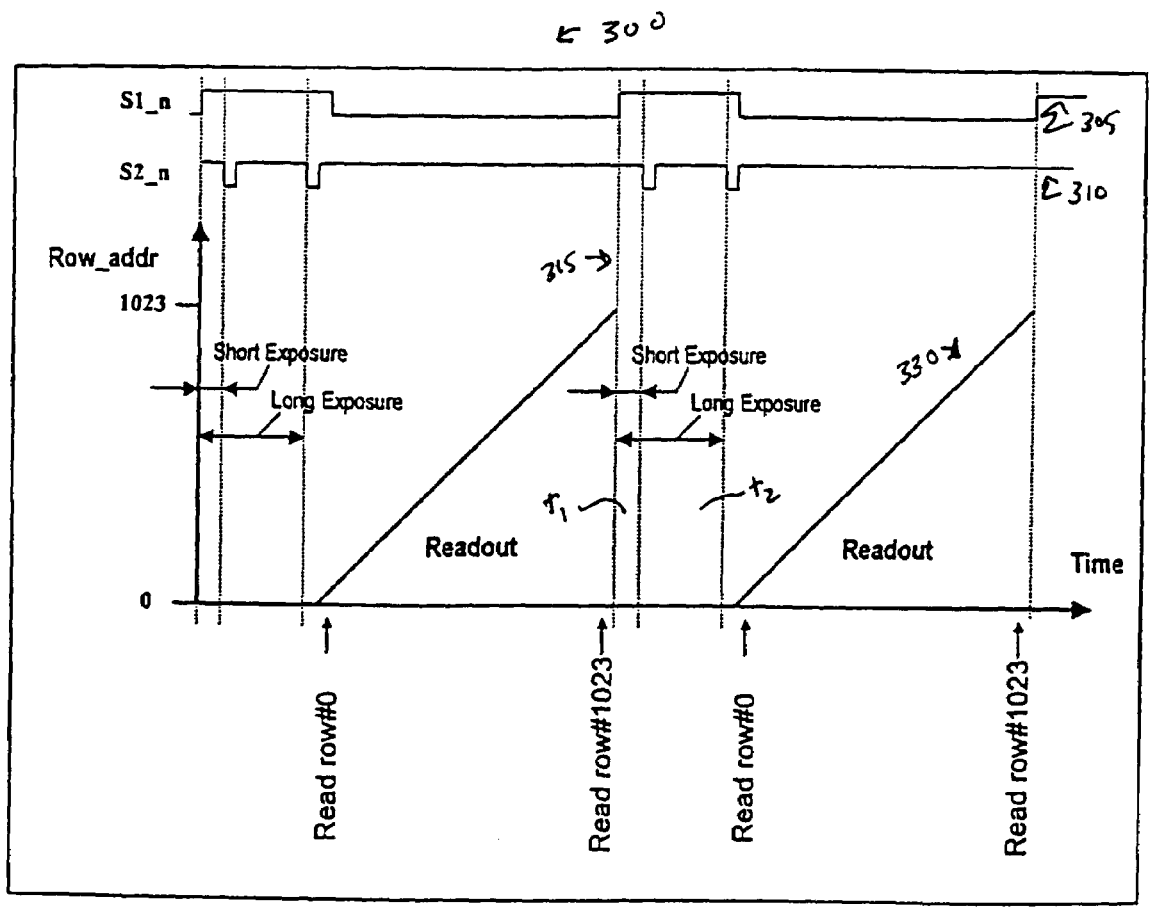
FIG. 3 illustrates sampling using the wide dynamic range process according to one embodiment of the present invention.

The sequence of operations with the wide dynamic range process 300 is illustrated graphically in FIG. 3. The switches S1 and S2 are enabled by active low pulses 305, 310, respectively. In wide dynamic range operation, the idea is to write the signal into the memory twice, first after short integration and then after long integration. The pixel 100 in FIG. 1 is based on voltage sharing between the photodetector PD and the analog memory C2. Thus, after two operations of sampling, the resulted voltage in the memory will be a linear superposition of the two signals representing bright and dark image.

The wide dynamic range operation process 300 is performed by resetting the analog memory capacitor C2 to $V_{rst}$ through the switch S3. The analog memory capacitor C2 may also be reset during the previous readout. The process 300 then resets the photodetector PD to $V_{rst}$ through the switch S1. The photodetector PD then begins integration of a signal to create a photocharge Q1 at time 315. After a short integration period t1, the signal is sampled to the analog memory capacitor C2 by enabling the switch S2 for a short time. The photodetector PD continues to integrate the signal for a long integration period t2 to create a photocharge Q2. Following the long integration period t2, the signal is again sampled to the analog memory capacitor C2 by enabling the switch S2. The signal is then read out 330 to all memories in the entire pixel array.

Because of the capacitor divider effect, after two samplings from the photodetector PD, the resulted signal voltage will be a combination of the signal accumulated during the short integration period t1 and the long integration period t2. For corresponding photocharges Q1 and Q2 at the photodetector PD, respectively, the signal voltage will be equal to:

$$V_{signal}=Q1*C2/(C1+C2)^2+Q2/(C1+C2).$$

The signal voltage $V_{signal}$ is a weighed sum of the photocharges Q1 and Q2, so that the short integration is given a weight lesser by amount C2/(C1+C2).

The option of having wide dynamic range is useful when a portion of the image after the long exposure is saturated. When the long exposure is saturated, the resulting response after summing the two signals will be the following:

$$V_{signal}=Q1*C2/(C1+C2)^2+Q_{sat}/(C1+C2);$$

where $Q_{sat}$ is the saturation charge for the photodetector PD.

Because the memories hold the short integration signal, the overlap of the long integration and the frame readout are no longer possible. However, this is not a problem for a pixel with a synchronous shutter. Typically the shutter is needed for making very short snaps, at least 10 times shorter than the frame time. Then the relative increase of frame time including the exposure will not be substantially lower than the frame rate of the image sensor.

Figure 4:
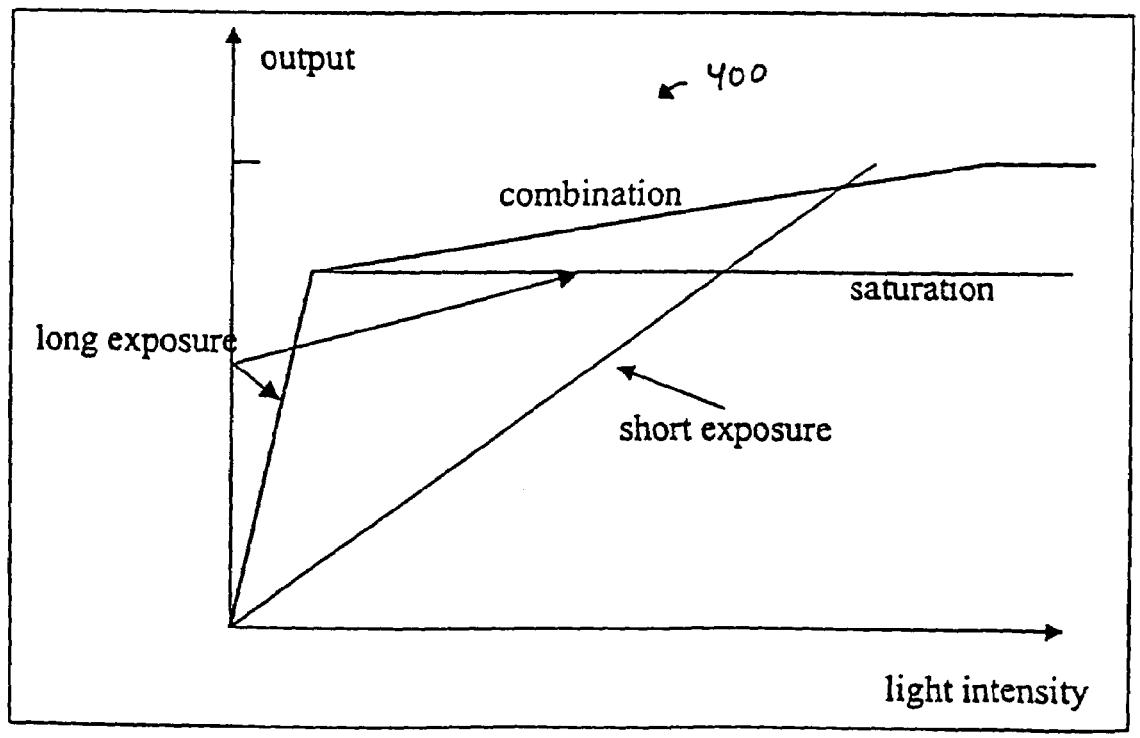
FIG. 4 illustrates an idealized transfer curve which is achievable using the present invention.

The graph 400 in FIG. 4 illustrates the idealized transfer curve which is achievable using the present invention. The resulting slope for the short integration is different from the original short exposure slope because of the C2/(C1+C2) factor.

However, one of the problems with the current pixel is that the saturation voltage for photodiodes, approximately 0V, is different from the pixel saturation voltage (−0.7 V for nMOS source follower SF transistor). Also, the analog memory capacitance C2 is only approximately ⅕ of the total capacitance of C1+C2. Therefore, the knee of the combined transfer curve is below the threshold of the source follower transistor SF and we do not see an improvement. Another problem can arise from the bulk charge. If there is a noticeable charge left in the pixel after saturation, then it can saturate the memory during the second sample and thus erase the signal stored in the analog memory C2 after short integration.

These problems can be addressed to achieve the dual-slope wide dynamic range response. First, the source follower SF and rowselect RowSel MOSFETS can be changed to p-MOS type transistors. Second, if the signal-to-noise ration is not a problem, the size of the memory capacitor C2 may be increased so that the knee of the combined transfer curve is above the threshold of the source follower transistor SF. Finally, using an antiblooming gate for the photodetector PD with potential artifact such as fixed pattern noise due to antiblooming threshold variation.

The present invention may be used with other pixels that do not use the freeze-frame structures, such as a photogate, with charge transfer rather that voltage sharing. The capacity of the detector at saturation should not then exceed the capacity of the memory to avoid erasing of the signal kept in the analog memory C2 after short integration.

Numerous variations and modifications of the invention will become readily apparent to those skilled in the art. Accordingly, the invention may be embodied in other specific forms without departing from its spirit or essential characteristics.

What is claimed is:

1. A method of obtaining an image signal using a solid state sensor, the method comprising:
    collecting a short image signal during a first time period;
    sampling the short image signal after the first time period;
    collecting a long image signal during a second time period;
    sampling the long image signal after the second time period; and
    combining the short image signal and the long image signal in a memory in the sensor to create a total image signal.

2. The method of claim 1, wherein the second time period includes the first time period.

3. The method of claim 1, further comprising resetting a photodetector in the sensor prior to collecting the short image signal.

4. The method of claim 1, further comprising resetting the memory containing the total image signal prior to collecting the short image signal.

5. The method of claim 1, further comprising simultaneous sampling of the short image signal while collecting the long image signal.

6. The method of claim 5, wherein the short image signals and the long image signals are not collected during the reading of the total image signal.

7. The method of claim 1, wherein the memory is a capacitor.

8. The method of claim 7, wherein the acts of collecting include operating a switch that selectively connects said capacitor to a photodetector.

9. The method of claim 1, wherein the second time period is longer than the first time period.

10. A pixel sensor comprising:
    a photodetector having a first memory element;
    a second memory element; and
    a plurality of switches including:
        a first switch constructed to connect the photodetector to a reset voltage source;
        a second switch constructed to connect the photodetector to second memory element for permitting transfer of a first and a second image signal collected in the photodetector during a respective first and second collection time period; and a third switch for connecting the second memory element to a reset voltage source, wherein the third switch is different than either the first or the second switch, and wherein the second memory element is constructed such that it is able to combine the first image signal and the second image signal to create a total image signal.

11. The pixel of claim 10, wherein the second time period includes the first time period.

12. The pixel of claim 10, further comprising a readout circuit to readout the total image signal from said second memory element.

13. The pixel of claim 10, wherein each of said first memory elements and said second memory elements comprise capacitors.

14. A method of operating an image sensor comprising:
resetting a capacitive structure by activating a first switch by connecting the capacitor to a reset voltage source;

resetting a photodetector of the image sensor by activating a second switch;

integrating charge at the photodetector during a first integration period to generate a first image signal;

transferring the first image signal from the photodetector to the capacitive structure by activating a third switch;

integrating charge at the photodetector during a second integration period to generate a second image signal;

transferring the second image signal from the photodetector to the capacitive structure by activating the third switch; and creating a total image signal by combining the first and the second image signals in the capacitive structure.

15. The method of claim 14, further comprising reading out the total image signal through a readout circuit.

* * * * *